(12) United States Patent
Jones et al.

(10) Patent No.: US 11,142,236 B2
(45) Date of Patent: Oct. 12, 2021

(54) INJECTION MOLDED RAKE LEVER ASSEMBLY

(71) Applicant: Steering Solutions IP Holding Corporation, Saginaw, MI (US)

(72) Inventors: Randy W. Jones, North Branch, MI (US); Michael P. Anspaugh, Bay City, MI (US); Robert W. Dubay, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/117,452

(22) Filed: Dec. 10, 2020

(65) Prior Publication Data

US 2021/0245792 A1    Aug. 12, 2021

Related U.S. Application Data

(60) Provisional application No. 62/971,489, filed on Feb. 7, 2020.

(51) Int. Cl.
*B62D 1/184*    (2006.01)
*G05G 1/04*    (2006.01)

(52) U.S. Cl.
CPC .............. *B62D 1/184* (2013.01); *G05G 1/04* (2013.01)

(58) Field of Classification Search
None
See application file for complete search history.

(56) References Cited

U.S. PATENT DOCUMENTS

| | | | |
|---|---|---|---|
| 6,860,669 B2 * | 3/2005 | Laisement | B62D 1/184 280/775 |
| 2018/0297624 A1 * | 10/2018 | Zhang | B62D 1/189 |

FOREIGN PATENT DOCUMENTS

| | | |
|---|---|---|
| DE | 102010000504 B3 | 3/2011 |
| DE | 102020124793 A1 | 4/2021 |

OTHER PUBLICATIONS

English translation of first Office Action regarding corresponding DE App. No 10 2021 100 628 7; dated Apr. 30, 2021.

* cited by examiner

*Primary Examiner* — Vicky A Johnson
(74) *Attorney, Agent, or Firm* — Dickinson Wright PLLC

(57) ABSTRACT

A rake lever assembly for a steering column is provided. The steering column is adjustable in an unlocked position of the rake lever assembly and is in a fixed position in a locked position of the rake lever assembly. The rake lever assembly includes a rake lever, the lever being rotatable for moving the clamping arrangement between the locked position and the unlocked position. The rake lever assembly also includes a metal stamping press fit to the rake lever.

13 Claims, 4 Drawing Sheets

INJECTION MOLDED RAKE LEVER ASSEMBLY

CROSS REFERENCE TO RELATED APPLICATION

This application claims priority to U.S. Provisional Patent Application No. 62/971,489, filed Feb. 7, 2020, the disclosure of which is incorporated by reference herein in its entirety.

BACKGROUND

Steering columns in vehicles may be adjustable in a rake direction and a telescope direction. The adjustable steering column may be unlocked in order to be adjusted to a desired position. Once the desired position is reached, the steering column may be locked in place to resist movement from the desired position.

A traditional adjustable steering column may include a column jacket, a compression bracket fixed to, and movable with, the column jacket, and a mounting bracket fixed to the vehicle. The column jacket and compression bracket are movable relative to the mounting bracket. The adjustable steering column may further include a rake lever. The rake lever is rotatable between a locked position where adjustment of the steering column is resisted and an unlocked position where adjustment of the steering column is permitted. The rake lever rotates a lock bolt that extends through the mounting bracket and compression bracket. Rotation of the lock bolt may actuate the rake lock between respective locked and unlocked positions.

To meet the low cost demand of customers in the automotive market, simple low cost alternatives to current products are constantly sought. Typical steering column rake lever assemblies utilize insert molding with metal inserts. Insert molding requires specialty suppliers which increases cost through the molding process. The cost is high due to insert handling and part logistics.

SUMMARY OF THE DISCLOSURE

According to one aspect of the disclosure, a rake lever assembly for a steering column is provided. The steering column is adjustable in an unlocked position of the rake lever assembly and is in a fixed position in a locked position of the rake lever assembly. The rake lever assembly includes a rake lever, the lever being rotatable for moving the clamping arrangement between the locked position and the unlocked position. The rake lever assembly also includes a metal stamping press fit to the rake lever.

According to another aspect of the disclosure, a steering column includes a jacket assembly. The steering column also includes a rake lever assembly operatively coupled to the jacket assembly. The rake lever assembly includes a rake lever rotatable for moving the clamping arrangement between the locked position and the unlocked position. The rake lever assembly also includes a metal stamping press fit to the rake lever. The rake lever assembly further includes a rake bolt operatively coupled to the rake lever and extending through the jacket assembly, wherein rotation of the rake lever rotates the rake bolt to adjust the steering column between an unlocked position and a fixed position in a locked position. The rake lever is a plastic injection molded component.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, various embodiments of the invention disclosed herein are shown.

Figure 1:
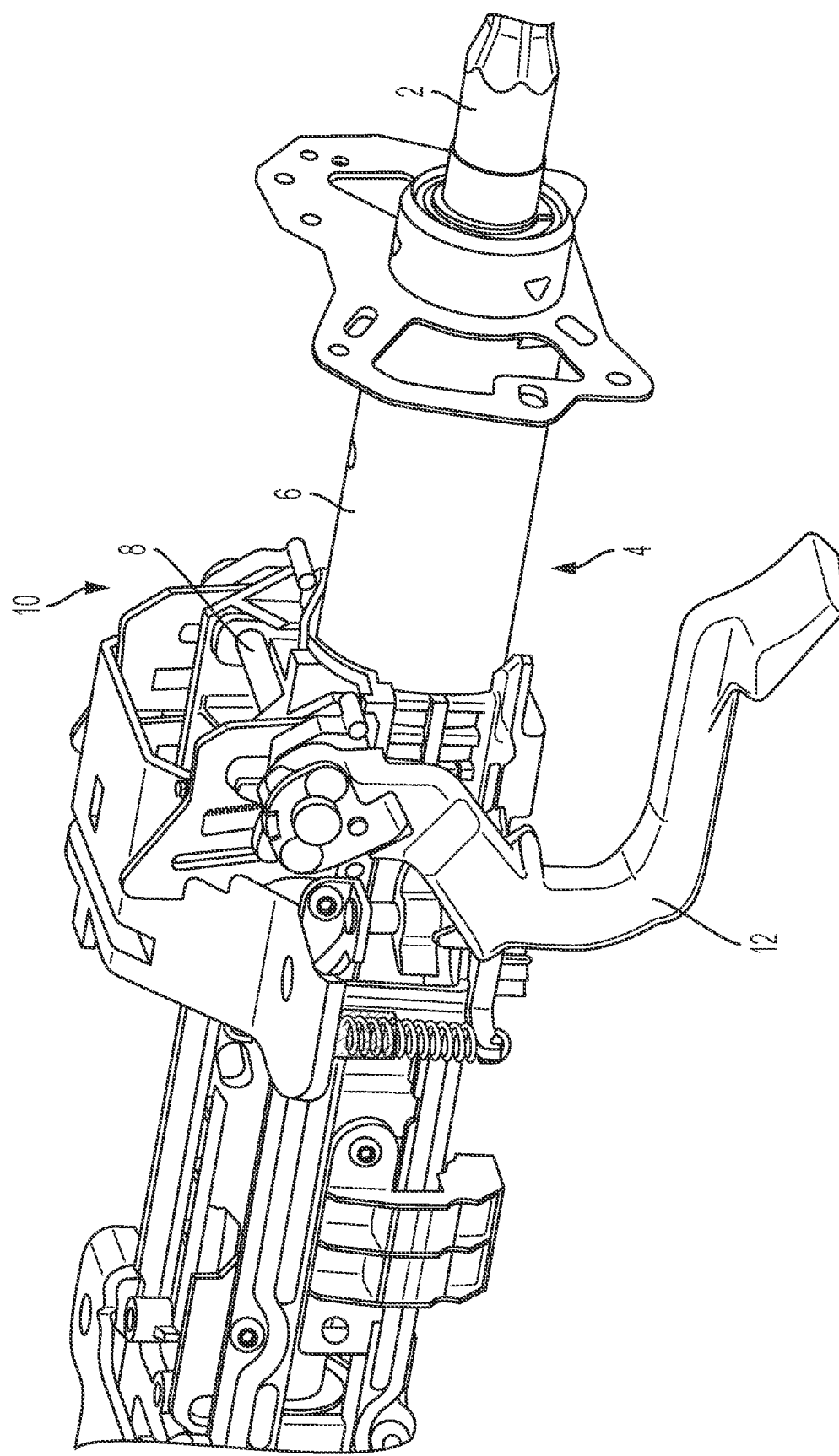
FIG. 1 is a perspective view of a portion of a steering column assembly.

FIG. 1 illustrates a steering shaft 2 partially disposed within a jacket assembly 4. The jacket assembly 4 includes an upper jacket 6 that is partially disposed within a lower jacket 8. A rake lever assembly 10 is provided for a manually adjustable steering column. A rotatable lever 12 (also referred to herein as "rake lever 12") is configured to actuate the rake lever assembly 10 between a locked position and an unlocked position. The rotatable lever 12 is an extension of the rake lever assembly 10 into a cabin (not shown) of the motor vehicle, the lever 12 being accessible to a driver (not shown). The driver may engage the lever 12 in order to transition the steering column assembly from a locked position to an unlocked position, or vice versa. In an unlocked position, the position of the steering column is adjustable and, when rotated into a locked position, the position of the steering column is fixed.

Figure 2:
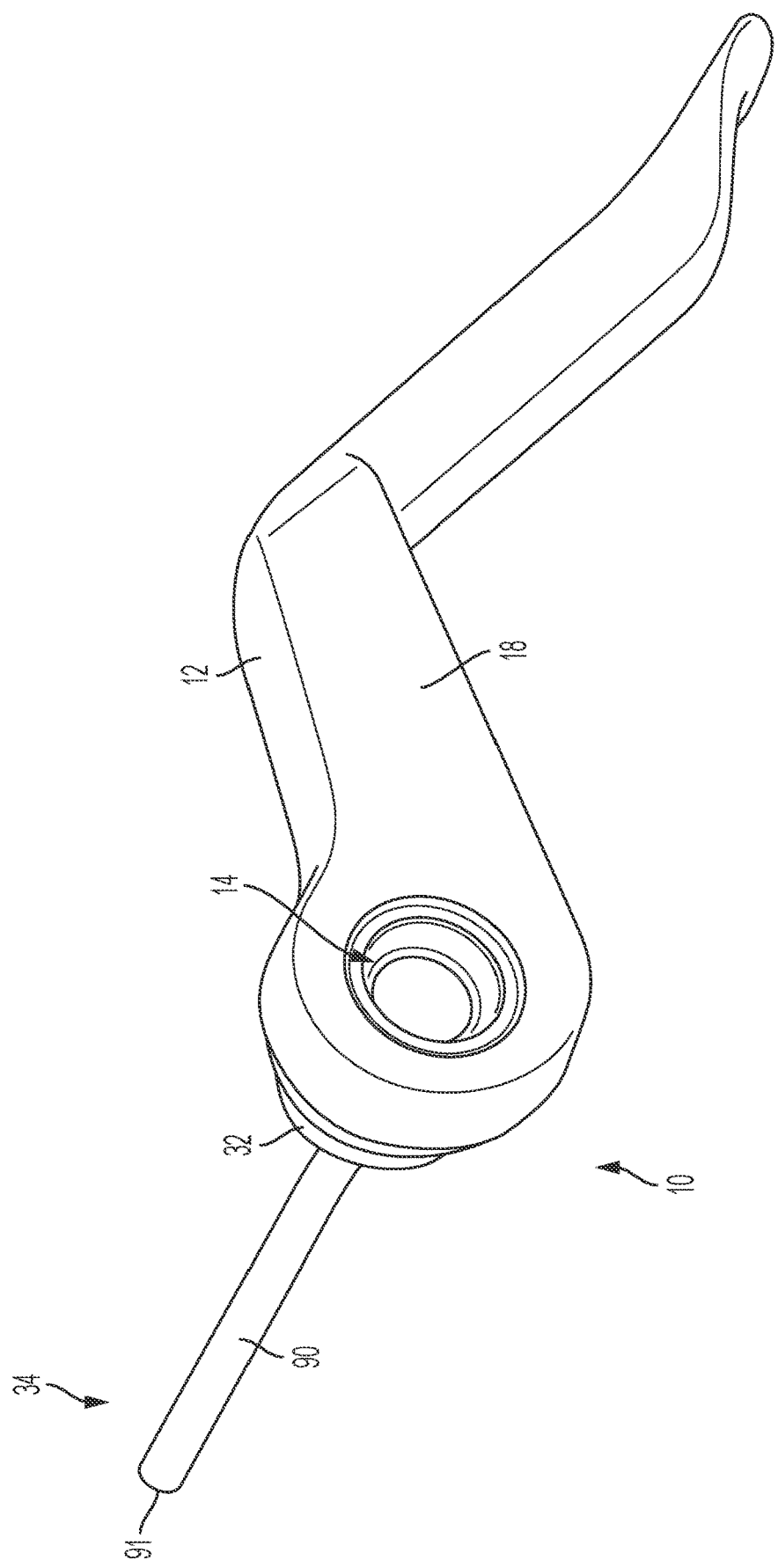
FIG. 2 is a perspective view of a rake lever assembly of the steering column assembly.

Referring now to FIG. 2, the rotatable lever 12 defines an aperture 14, which extends from an inner face of the lever 12 to an outer face 18 of the lever 12. The rake lever assembly 10 also includes a cam arrangement 32 that interacts with the rake lever 12. A clamp bolt 34 is operatively coupled to the rake lever 12. The clamp bolt 34 extends through the cam 32 and the lower jacket 8. The cam 32 is an instrument for converting rotation of the lever 12 to a linear force to clamp the steering column assembly. The clamp bolt 34 includes a bolt shank 90 with an end point 91 and a bolt head, with the bolt head operatively coupled to the lever 12.

Figure 4:
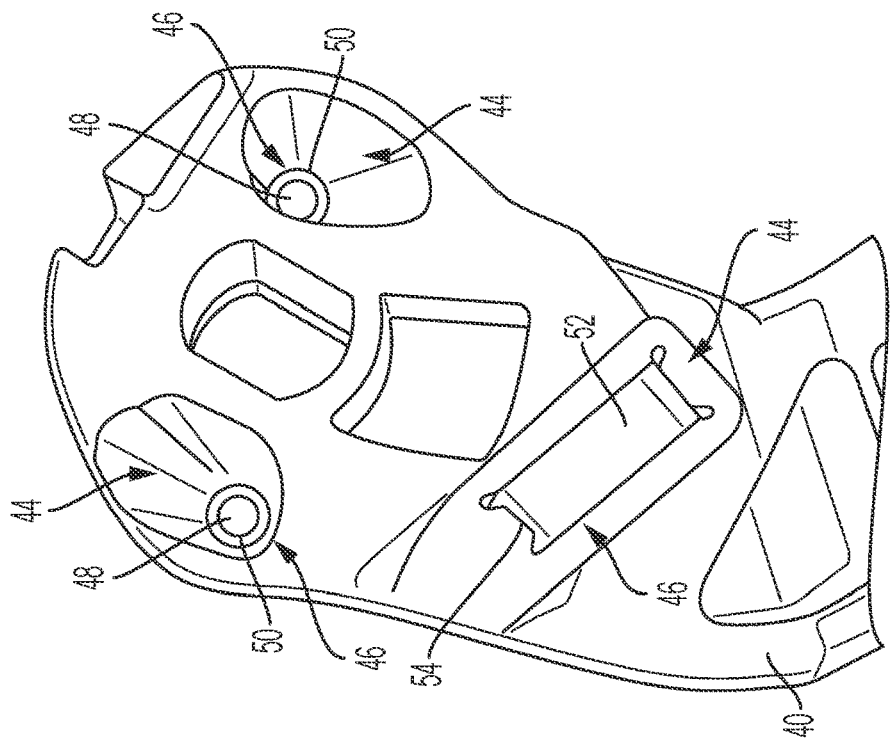
FIG. 4 is a perspective view of a portion of the rake lever assembly further illustrating the rake lever and the metal stamping.
Figure 3:
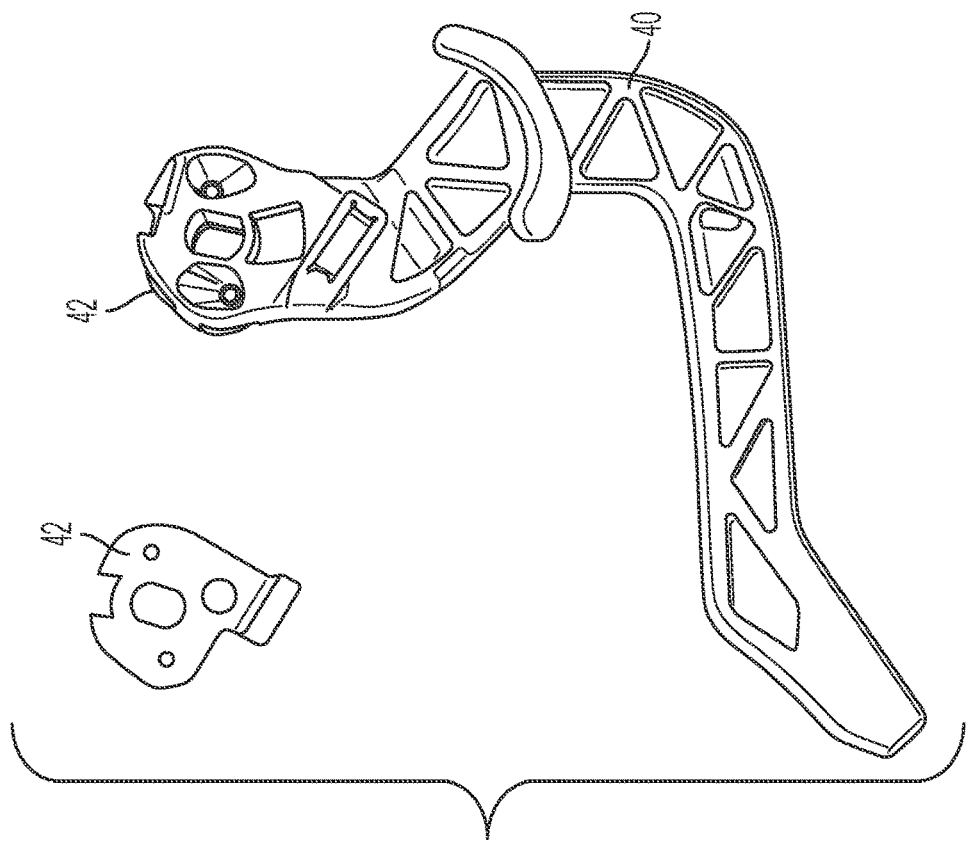
FIG. 3 is a perspective view of a rake lever and a metal stamping of the rake lever assembly.

FIGS. 3 and 4 illustrate the rake lever assembly 10 in greater detail. The rake lever assembly 10 includes a rake lever 40 and a metal stamping 42. The rake lever 40 and the metal stamping 42 are shown in a disassembled condition and an assembled condition in FIG. 3, and in an assembled condition in FIG. 4.

The metal stamping 42 may be any suitable metal. In some embodiments, steel is the selected metal. The rake lever 40 is a plastic injection molded component and may be formed in geometries that differ from the illustrated embodiment. Regardless of the specific shape of the overall rake lever 40, the end region of the rake lever 40 that includes the aperture 14 includes features which allow the metal stamping 42 to be press fit thereto. In particular, the rake lever 40 includes one or more receiving features generally referenced with numeral 44. The receiving features 44 may be apertures, recesses, or the like. The metal stamping 42 includes one or more protrusion features 46 that are inserted into the receiving features 44 in a press fit manner, thereby retaining the rake lever 40 and the metal stamping 42 to each other. In the illustrated embodiment, two substantially cylindrical protrusions 48 (also referred to herein as pins) are inserted into respective through holes 50 of the rake lever 40. Although described above and illustrated as a pair of pins, it is contemplated that more or fewer pins are included. Additionally, an elongated protrusion 52 of the metal stamping 42 is inserted into a slot 54 of the rake lever 12. However, it is to be appreciated that different shapes may be utilized for the receiving features 44 and/or the protrusion features 46. It is also to be appreciated that more or fewer features 44, 46 are contemplated.

Insertion of at least one of the protrusion features 46 within the receiving apertures 44 prevents rotation of the metal stamping 42 relative to the rake lever 12. The anti-rotation feature may be the pins 48, the elongated protrusion 52, a radially outer protrusion 55 of the rake lever 12, or a combination of the protrusions.

The two-piece assembly, i.e., plastic injection molded rake lever 40 and metal stamping 42, is a more cost-efficient assembly when compared to a three-piece (or more) assembly that requires an overmolding process and/or a powder metal pin retention and travel stop. The rake lever 40 provides the opportunity to form shallow pin end divots for ease of forming since the rake lever 40 is retaining the pins.

Figure 7:
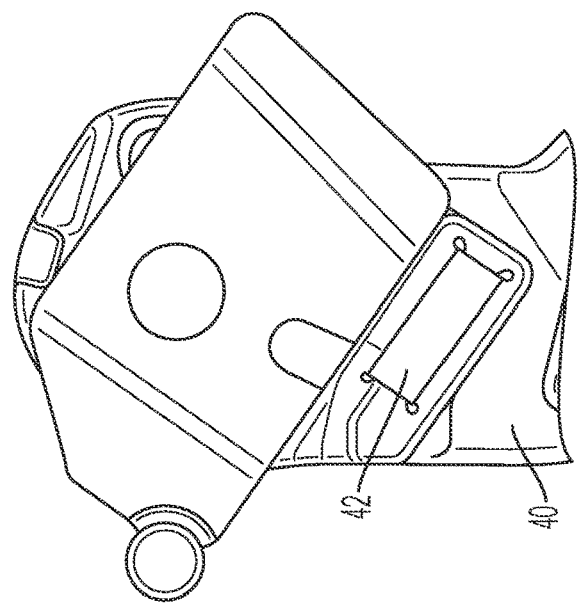
FIGS. 5-7 are various elevational views of the rake lever assembly.
Figure 6:
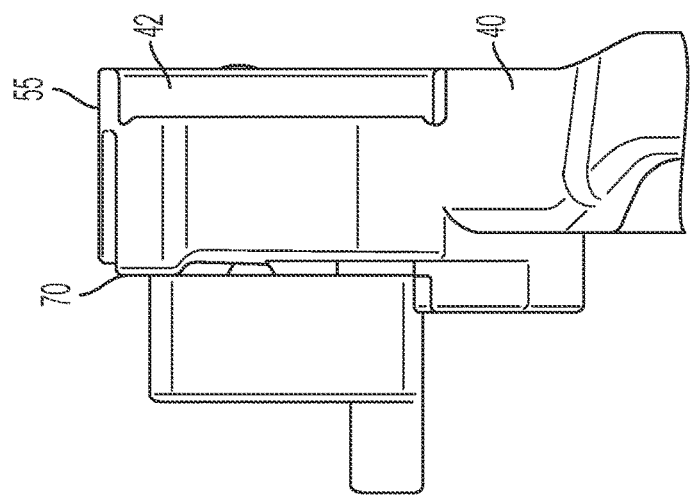
Figure 5:
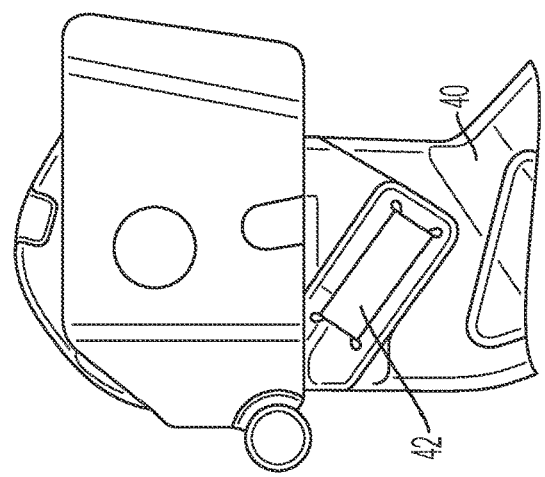

FIGS. 5-7 illustrate the rake lever 40 and metal stamping 42 during operation of the rake lever assembly 10. The rake lever 40 and metal stamping 42 provide integrated stabilizing features. For example, secondary cam features 70 on the rake lever 40 react against associated components of the rake lever assembly 10. Additionally, the through hole in plastic is smaller than the pin, which allows the pin to assist in lever retention. The rake lever 40 includes integrated pin retention pockets with over-travel stops.

Advantageously, the two components of the rake lever assembly 10 incorporate anti-rotation, locating and de-lashing features which can be easily processed into an assembly.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A rake lever assembly for a steering column, the steering column adjustable in an unlocked position of the rake lever assembly and in a fixed position in a locked position of the rake lever assembly, the rake lever assembly comprising:

a rake lever, the lever being rotatable for moving a clamping arrangement between the locked position and the unlocked position; and a metal stamping press fit to the rake lever, wherein the metal stamping comprises a plurality of protrusion features that are press fit within a plurality of receiving apertures of the rake lever in an assembled condition of the rake lever assembly.

2. The rake lever assembly of claim 1, wherein the rake lever is a plastic injection molded component.

3. The rake lever assembly of claim 1, wherein the metal stamping is formed of steel.

4. The rake lever assembly of claim 1, wherein the plurality of protrusion features comprises at least one pin and an elongated protrusion, wherein the plurality of receiving apertures comprises at least one pin aperture and an elongated aperture.

5. The rake lever assembly of claim 4, wherein inserting at least one of the plurality of protrusion features within at least one of the plurality of receiving apertures prevents rotation of the metal stamping relative to the rake lever.

6. The rake lever assembly of claim 1, wherein press fitting at least one of the plurality of protrusion features within at least one of the plurality of receiving apertures at least partially retains the metal stamping to the rake lever.

7. The rake lever assembly of claim 1, wherein the rake lever includes at least one cam feature protruding from an inner face of the rake lever.

8. A steering column comprising:

a jacket assembly; and a rake lever assembly operatively coupled to the jacket assembly, the rake lever assembly comprising:

a rake lever rotatable for moving a clamping arrangement between the locked position and the unlocked position;

a metal stamping press fit to the rake lever; and a rake bolt operatively coupled to the rake lever and extending through the jacket assembly, wherein rotation of the rake lever rotates the rake bolt to adjust the steering column between an unlocked position and a fixed position in a locked position;

wherein the rake lever is a plastic injection molded component, wherein the metal stamping comprises a plurality of protrusion features that are press fit within a plurality of receiving apertures of the rake lever in an assembled condition of the rake lever assembly.

9. The steering column of claim 8, wherein the metal stamping is formed of steel.

10. The steering column of claim 8, wherein the plurality of protrusion features comprises at least one pin and an elongated protrusion, wherein the plurality of receiving apertures comprises at least one pin aperture and an elongated aperture.

11. The steering column of claim 10, wherein inserting at least one of the plurality of protrusion features within at least one of the plurality of receiving apertures prevents rotation of the metal stamping relative to the rake lever.

12. The steering column of claim 8, wherein press fitting at least one of the plurality of protrusion features within at least one of the plurality of receiving apertures at least partially retains the metal stamping to the rake lever.

13. The steering column of claim 8, wherein the rake lever includes at least one cam feature protruding from an inner face of the rake lever.

* * * * *